United States Patent [19]
Rowley

[11] Patent Number: 5,220,652
[45] Date of Patent: Jun. 15, 1993

[54] COMPUTER APPLICATION PROGRAMS DATA INPUT INTERFACE FOR HANDICAPPED PERSONS RESPONSIVE TO MULTIPLE PUSH BUTTONS FOR SELECTING DATA STORED IN BINARY TREE

[76] Inventor: Blair A. Rowley, 1128 Ludlow Rd., Xenia, Ohio 45385

[21] Appl. No.: 370,102

[22] Filed: Jun. 22, 1989

Related U.S. Application Data

[63] Continuation of Ser. No. 887,661, Jul. 21, 1986, abandoned.

[51] Int. Cl.$^5$ .............................................. G06F 3/02
[52] U.S. Cl. .................... 395/275; 364/225.6; 364/234.1; 364/234.2; 364/251.6; 364/283.3; 364/928.1; 364/928.2; 364/974.3; 364/943.1; 364/DIG. 1; 395/156; 395/160; 395/700
[58] Field of Search ... 364/200 MS File, 900 MS File; 395/156, 160, 275, 600, 700

[56] References Cited

U.S. PATENT DOCUMENTS

| | | | |
|---|---|---|---|
| 3,292,489 | 12/1966 | Johnson et al. | 88/24 |
| 3,507,376 | 4/1970 | Kafafian | 400/87 |
| 3,781,802 | 12/1973 | Kafafian | 340/147 R |
| 3,798,599 | 3/1974 | Kafafian | 340/147 R |
| 3,916,387 | 10/1975 | Woodrum | 364/200 |
| 4,156,903 | 5/1979 | Barton et al. | 364/200 |
| 4,241,521 | 12/1980 | Dufresne | 434/112 R |
| 4,274,753 | 6/1981 | Brown | 400/87 |
| 4,402,056 | 8/1983 | Sado | 364/900 |
| 4,406,998 | 9/1983 | Willough | 340/815.01 |
| 4,429,385 | 1/1984 | Cichelli et al. | 370/92 |
| 4,454,576 | 6/1984 | McInroy et al. | 364/200 |
| 4,458,238 | 7/1984 | Learn | 400/87 |
| 4,480,308 | 10/1984 | Grafe et al. | 364/200 |
| 4,486,630 | 12/1984 | Fetchko | 400/87 |
| 4,509,137 | 4/1985 | Yoshida | 364/900 |
| 4,530,068 | 7/1985 | Nakanishi | 364/900 |
| 4,559,598 | 10/1985 | Goldwassev et al. | 364/900 |
| 4,597,056 | 6/1986 | Washizuka | 364/900 |
| 4,606,002 | 8/1986 | Waisman | 364/200 |
| 4,613,946 | 9/1986 | Forman | 364/518 |
| 4,642,610 | 2/1987 | Smith, III | 400/87 |
| 4,648,070 | 3/1987 | Washizuka | 364/900 |
| 4,688,195 | 8/1987 | Thompson et al. | 395/12 |
| 4,692,858 | 9/1987 | Redford et al. | 364/280 |
| 4,706,212 | 11/1987 | Toma | 364/900 |
| 4,730,270 | 3/1988 | Okajima | 364/900 |
| 4,731,735 | 3/1988 | Borgendale et al. | 364/200 |
| 4,807,181 | 2/1989 | Duncan, IV et al. | 364/900 |

OTHER PUBLICATIONS

The Art of Computer Programming, vol. 3, Sorting and Searching Knuth, Donald E, Addison Wesley Publishing Co., 1973, pp. 422–429, 486–491.

*Primary Examiner*—Robert B. Harrell
*Assistant Examiner*—Ken S. Kim
*Attorney, Agent, or Firm*—Harness, Dickey & Pierce

[57] ABSTRACT

A text processing method to be practiced by a handicapped person. A programmed computer has a dictionary of words stored in files accessed by selection of the initial letters of the words. The handicapped person operates one or more switches to designate the initial letter of the word. Thereafter, the switches are operated to control rapid searching of the designated file and selection of the desired word therefrom. The switches are also used for editing of text.

16 Claims, 14 Drawing Sheets

FIG-4

```
To search left or right use
the ARROWS. To pick a vocabulary
file use <P> or use <Q> to quit

ABCDEFGHIJKLMNOPQRSTUVWXYZ◊
             ♦
```

FIG-5

```
To search left or right use
the ARROWS. To pick a vocabulary
file use <P> or use <Q> to quit

ABCDEFGHIJKLMNOPQRSTUVWXYZ◊
♦
```

FIG-6

```
To search the file use
the LEFT OR RIGHT ARROWS.
To pick a word use <P>.
If you want to EDIT the word or get out
of the file use <E> anaphase
```

FIG-7

```
To search the file use
the LEFT OR RIGHT ARROWS.
To pick a word use <P>.
If you want to EDIT the word or get out
of the file use <E>

Afro
```

FIG-8

```
To search the file use
the LEFT OR RIGHT ARROWS.
To pick a word use <P>.
If you want to EDIT the word or get out
of the file use <E> alloy
```

FIG-9

```
To move use the arrows.
Use <P> or <9> to pick your choice

-----> alloy

-->  Do nothing to it
       Capitalize first letter
       CAPITALIZE WHOLE WORD
       Add a period (and a space)
       Delete last letter
       Append to last word
       Discard the word
```

FIG-10

```
To move use the arrows.
Use <P> or <9> to pick your choice

-----> alloy

Do nothing to it
-->   Capitalize first letter
      CAPITALIZE WHOLE WORD
      Add a period (and a space)
      Delete last letter
      Append to last word
      Discard the word
```

FIG-11

```
<P> = PICK
<9> = EDIT

Alloy
```

FIG-12

```
To search left or right use
the ARROWS. To pick a vocabulary
file use <P> or use <Q> to quit

ABCDEFGHIJKLMNOPQRSTUVWXYZ0
              ↑

Alloy
```

FIG-13

```
To search left or right use
the ARROWS. To pick a vocabulary
file use <P> or use <Q> to quit

ABCDEFGHIJKLMNOPQRSTUVWXYZ0
              ↑

Alloy
```

FIG-14

```
To search the file use
the LEFT OR RIGHT ARROWS.
To pick a word use <P>.
If you want to EDIT the word or get out
of the file use <E>

Alloy toasty
```

FIG-15

```
To search left or right use
the ARROWS. To pick a vocabulary
file use <P> or use <Q> to quit ABCDEFGHIJKLMNOPQRSTUVWXYZQ
       ↑
Alloy toasty
```

FIG-16

```
To search left or right use
the ARROWS. To pick a vocabulary
file use <P> or use <Q> to quit

ABCDEFGHIJKLMNOPQRSTUVWXYZ₀
                          ↑

Alloy toasty
```

FIG-17

```
To search use the ARROWS
To pick use <P> or Q to quit abcdefghijklm← .nopqrstuvwxyz
             ↑
0123456789

```
To search use the ARROWS
To pick use <P> or 9 to quit abcdefghijklm←  .nopqrstuvwxyz
              ⇧
0123456789

```
To search use the ARROWS
To pick use <P> or 9 to quit abcdefghijklm← .nopqrstuvwxyz
              ⇧
0123456789

!"#$%&'()*+,-./:;<=>?@

--> i

LENGTH:  1
```

FIG-20

```
To search use the ARROWS
To pick use <P> or ? to quit abcdefghijklm← .nopqrstuvwxyz
                ↑
0123456789

!"#$%&'()*+,-/:;<=>?@

--> 1

LENGTH:   1
```

FIG-21

```
To search use the ARROWS
To pick use <P> or ? to quit abcdefghijklm← .nopqrstuvwxyz
               ⇧
0123456789

!"#$%&'()*+,-/:;<=>?@

--> 1.

.

LENGTH:   2
```

FIG-22

```
To move use the arrows.
Use <P> or <9> to PICK your choice

-----> is

-->  Do nothing to it
     Append it to the previous word
     Capitalize first letter
     CAPITALIZE WHOLE WORD
     Discard it please
```

FIG-23

```
To search left or right use
the ARROWS. To pick a vocabulary
file use <P> or use <9> to quit ABCDEFGHIJKLMNOPQRSTUVWXY
            ↑
Alloy toasty is
```

COMPUTER APPLICATION PROGRAMS DATA INPUT INTERFACE FOR HANDICAPPED PERSONS RESPONSIVE TO MULTIPLE PUSH BUTTONS FOR SELECTING DATA STORED IN BINARY TREE

This is a continuation of U.S. patent application Ser. No. 887,661, filed Jul. 21, 1986, now abandoned.

BACKGROUND OF THE INVENTION

This invention relates to a text processing method which may be practiced by a handicapped person who has access to a personal computer. Many word processing programs are available for editing and organizing text material, but these programs require entry of raw text via a keyboard. If an operator has normal eye-hand coordination, it is a relatively simple matter to produce neatly typed documents using such systems. However, these systems are not suitable for use by a person who has lost the normal use of the hands. Often times such persons have sufficient voluntary movement control for operating one or more fairly large switches but are unable to perform other more complex manual tasks. Accordingly, there exists a need for a system which will enable such handicapped persons to create processed text.

The problem of enabling communication by the handicapped has been addressed in a number of ways by the prior art. For instance, Kafafian U.S. Pat. No. 3,781,802 discloses a communication system comprising a plurality of keys which are configured for actuation by a handicapped person. These keys may be operated in various sequences for selection of solenoids which will cause the printing of symbols of the type appearing on a conventional typewriter keyboard.

Kafafian U.S. Pat. No. 3,798,599 discloses a communication system for the handicapped having a single-input transducer or switch for operation of a typewriter or the like. By operating the switch, the handicapped person causes the system to step through a two-dimensional matrix for selection of a symbol to be printed.

Dufresne U.S. Pat. No. 4,241,521 discloses a communication system wherein a series of symbols are arranged in a two-dimensional matrix for selection from an associated keyboard. The keyboard has UP, DOWN, LEFT, RIGHT, RECORD, and PLAY BACK switches which may be operated by a handicapped person to control selection of symbols from the array. Each symbol has an associated indicator light that is energized when the associated symbol has been selected.

It will be appreciated that all of the above prior art devices require tedious symbol-by-symbol selection. They merely replace a typewriter keyboard with another different type of keyboard. Thus their operating speed is a direct function of the speed at which a handicapped person is able to operate the switches. A somewhat different system is disclosed in Brown U.S. Pat. No. 4,274,753 wherein an electrical switch may be operated to select a plural digit number. The selected number corresponds to a message which may be any desired length. Another communication device which is not limited to selection of individual symbols is disclosed in Willough U.S. Pat. No. 4,406,998. In the Willough patent, means are provided for selecting either symbols or words from a message block. Clearly, neither the Brown nor the Willough device is suitable for text processing.

SUMMARY OF THE INVENTION

This invention provides a method of text processing wherein a dictionary of words is stored in a computer memory. A program is provided for causing the computer to display the letters of the alphabet on its monitor. A handicapped person operates one or more switches to select that letter which is also the first letter of a word to be processed. Upon selection of such a letter, the computer consults its memory and commences displaying words having the selected letter as their initial letter. Presentation of the words proceeds in accordance with a predetermined searching algorithm under operational control of the handicapped person. Selection of the desired word is signalled by the handicapped person through operation of a switch. The sequence is repeated until an entire message mas been selected. The assembled message may comprise all upper case letters, but preferably a routine is provided for enabling the handicapped person to cause appropriate punctuation of the assembled text.

In the preferred embodiment, the computer stores its dictionary of words in a series of files corresponding to the letters of the alphabet. Once a file has been selected, searching of the file proceeds on a binary basis. The first words selected for presentation to the handicapped person is the middle word of the file. Switching means are provided for enabling the handicapped person to cause the computer to search either forwardly or rearwardly through the file. Each operation of the switch causes the computer to advance in the selected direction halfway to the end of the file. This technique enables selection of any word within a 4,000 word file with no more than 12 switch closures.

It is therefore an object of this invention to provide an improved method for text processing by handicapped persons. Other further objects and advantages of the invention will be apparent from the following description, the accompanying drawings, and the appended claims.

BRIEF DESCRIPTION OF THE DRAWINGS

FIGS. 4–24 illustrate a series of monitor presentations during a typical text processing sequence; more specifically, FIG. 4 illustrates the monitor presentation with the pointer pointing to a generally centralized location, namely the letter "M";

FIG. 5 is a similar monitor presentation with the pointer pointing at the letter "A";

FIG. 6 is a monitor presentation showing a first word beginning with the letter "A";

FIG. 7 illustrates a monitor presentation showing a second word beginning with the letter "A";

FIG. 8 is a monitor presentation illustrating a third word beginning with the letter "A";

FIG. 9 illustrates a monitor presentation illustrating the word "alloy" having been selected;

FIG. 10 is a monitor presentation illustrating the selection by the user of the "capitalized first letter" modification of the word "alloy";

FIG. 11 is yet another monitor presentation showing the word "Alloy" (with initial capitalization);

FIG. 12 illustrates the monitor presentation with the word "Alloy" selected and with the pointer returned to the M location;

FIG. 13 is a monitor presentation showing the letter "T" being selected;

FIG. 14 is a monitor presentation showing the word "toasty" being selected;

FIG. 15 is a monitor presentation showing the words "Alloy" and "toasty" having been selected and the pointer returned to the "M" position;

FIG. 16 shows the pointer at a symbol used to select a shifted keyboard;

FIG. 17 shows the alphanumeric choices corresponding to the shifted keyboard with the pointer at a generally central location;

FIG. 18 illustrates the selection of the letter "i";

FIG. 19 illustrates the letter "i" having been selected;

FIG. 20 illustrates the selection of the letter "s";

FIG. 21 illustrates the selection of the letters "i" and "s," thereby spelling the word "is";

FIG. 22 shows the selection of the option "do nothing to it";

FIG. 23 shows the resultant selection of the words "Alloy toasty is"; and

FIG. 24 is a final monitor presentation allowing the user to print the phrase "Alloy toasty is" to the printer.

DESCRIPTION OF THE PREFERRED EMBODIMENTS

Figure 1:
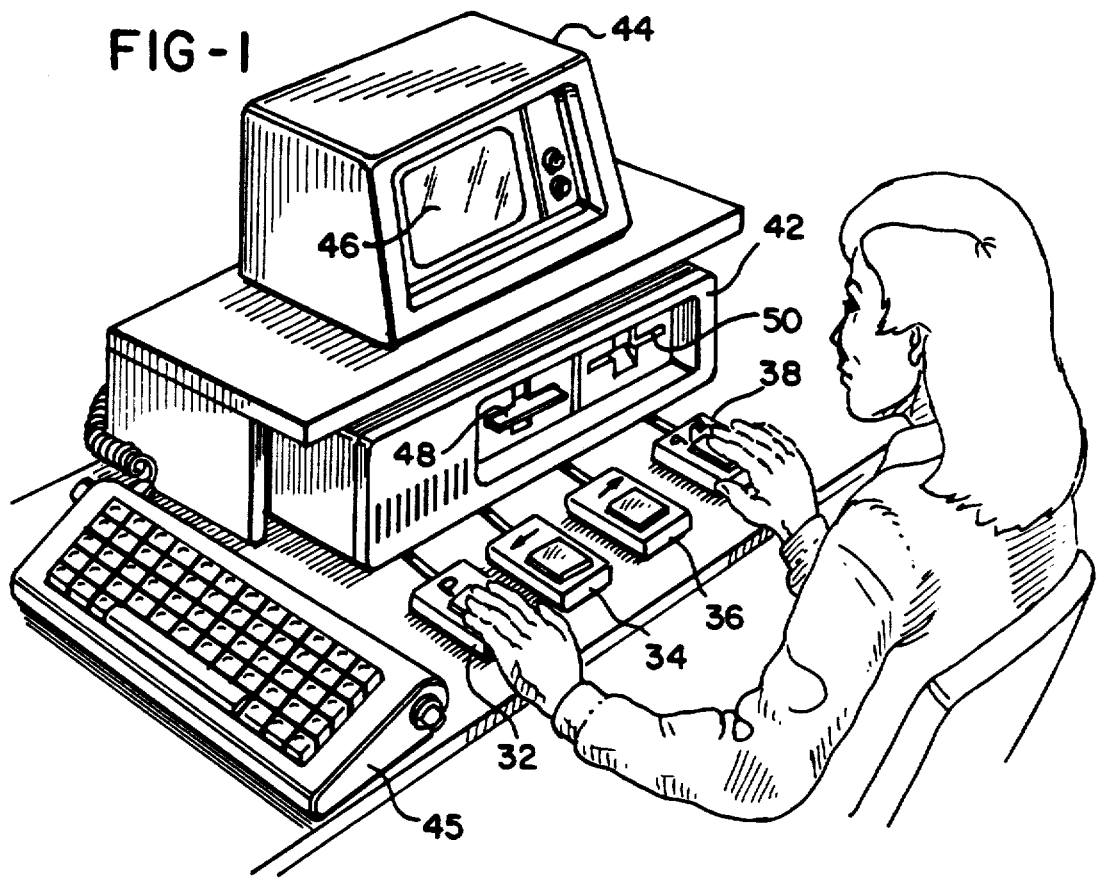
FIG. 1 is a pictorial illustration of a system configured for practicing the text processing method of the present invention.

In the preferred embodiment of the invention, text processing is performed through use of a programmed personal computer known as the IBM PC and sold by International Business Machines Corporation of Armonk, N.Y. The specific embodiment described herein utilizes an IBM PC equipped with a 640 kilobyte RAM disk and a game port option. The system may appear as generally illustrated in FIG. 1 and includes four large momentary switches 32, 34, 36 and 38 connected into the game port terminal 40 (FIG. 2) at the rear of computer 42. A monitor 44, including a screen 46, is positioned for viewing by a handicapped person who desires to process text. A keyboard 45 is available for programming purposes and for printer control. Computer 42 is fully described in product literature available from the manufacturer and is programmed as discussed below.

The method of the present invention utilizes as disk operating system (DOS) available on a flexible disk supplied by the manufacturer of the computer and a specially prepared source program stored on another flexible disk. The source program is prepared in accordance with the listing set forth in Table I and is stored on a flexible disk in the customary manner. A dictionary of words divided into 26 files and stored on two flexible disks is also provided. These files are organized alphabetically and are named in accordance with their initial letters. Files A-M may be stored on one flexible disk, and files N-Z on the other. These files may be prepared by consulting a standard dictionary, loading the entries into the computer memory and thereafter off-loading onto the flexible disks in the customary manner.

Figure 2:
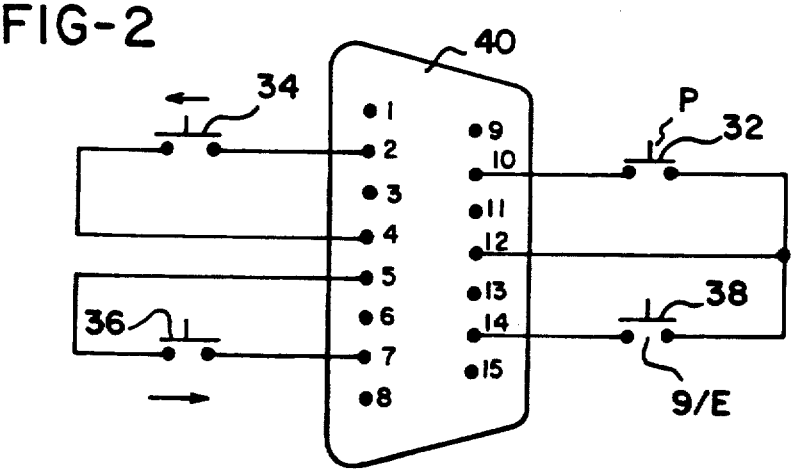
FIG. 2 is a wiring diagram for switches connected to a game port connector of an IBM Personal Computer.

Operation of the text processing method commences in the customary manner by booting DOS and then booting the program disk. Thereafter the A-M and N-Z flexible disks are placed into the left and right disk drives 48, 50, respectively, for reading onto the RAM disk in accordance with operating instructions provided by the computer manufacturer. Thereafter a series of presentations appear on screen 46 instructing the operator regarding the proper operation of switches 32, 34, 36 and 38. These switches are connected to game port terminal 40, as illustrated in FIG. 2, and are marked with the letter P, a left arrow symbol, a right arrow symbol, and the designation 9/E, respectively. The "P" switch is used for picking a file or a word within a file. The left and right arrow switches cause left and right progressive movement through symbols and files presented on screen 46. The "9/E" switch is used variously for initiating an editing function or ending a sequence. This switch may be operated for execution of either a "9" instruction or an "E" instruction.

Figure 3:
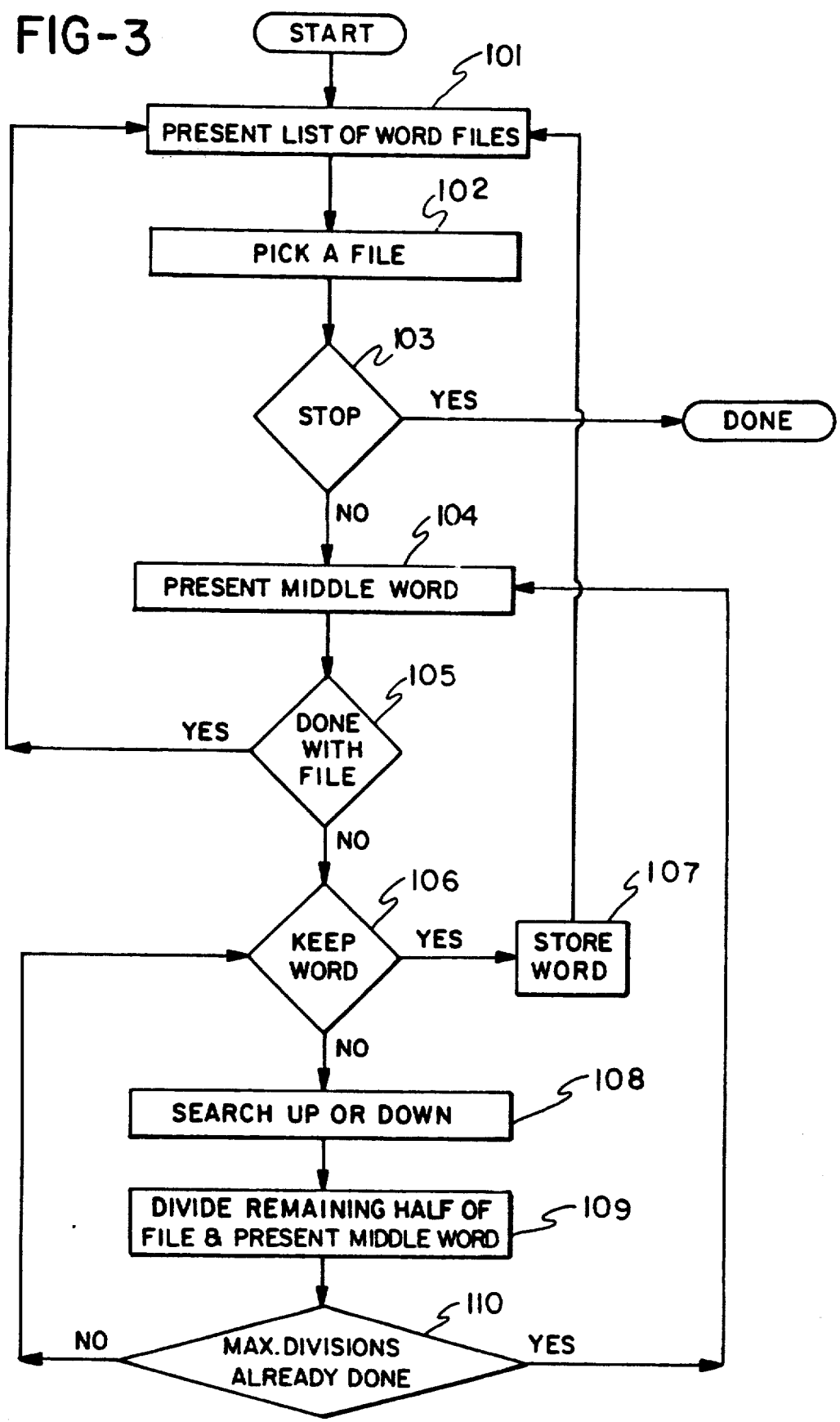
FIG. 3 is a generalized flowchart for the method of the present invention
Figure 24:
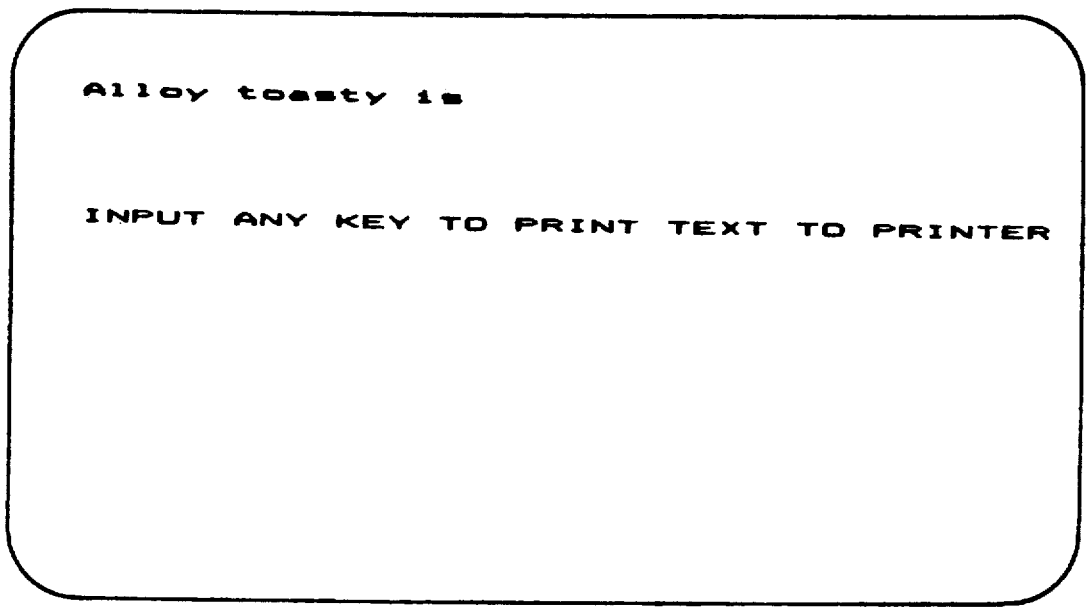

As illustrated in FIG. 3, a text processing sequence commences with presentation of a list of word files (block 101). This is simply a listing of the letters A-Z on screen 46. Switches 34 and 36 are used to direct a cursor across the list of letters until the desired file is indicated. For instance, if the first word in the text to be processed in the word "alloy", then file "A" is first desired. When the cursor has been brought in position under the letter A, switch 32 is operated to pick the "A" file (block 102). Thereafter the computer causes the middle word in the "A" file to be presented on screen 46 (block 104). Then switches 34, 36 are operated to cause the computer to search through the words in the "A" file (block 108). In the preferred embodiment, the searching is done on a binary basis whereby the computer moves in the desired direction through the file halfway toward an established limit with each operation of switches 34 or 36 (block 109). When the desired word has been presented on screen 46, it is selected by operating switch 32 (block 107). After the word has been selected, the computer may be directed to enter an editing routine by operating switch 38. Decision points within the method are illustrated in FIG. 3 by the reference numerals 103, 105, 106 and 110. As hereinafter described in detail, the method may include provision for letter-by-letter construction of words not present in any of the stored files.

For a better understanding of the operation of the text processing method, reference now will be made to FIGS. 4-24, which present an example illustrating a series of screen presentations during a typical text processing sequence. FIG. 4 illustrates the screen presentation which appears upon entry into the text processing program. The screen presentation includes operating instructions and a line of 26 characters comprising the alphabet. A special "build" symbol is placed at the end of the alphabet, and a cursor in the form of an upwardly pointing arrow is directed at the letter "M."

The first step in the text processing method is to select the letter which is the initial letter of the first word comprising a message to be composed. By way of example, if the first word of the message is "alloy," then the operator selects the letter "A." This is done by operating the "left arrow" switch 34 repeatedly until the cursor is positioned below the letter "A." Operation of either of switches 34 or 36 causes binary cursor movement by calculating value for a cursor control variable M in accordance with the following logical sequence:

1. If the left arrow control is selected, then set $R=M-1$, where R is a right-hand limit variable and M is the value of the cursor control variable for the immediately preceding program loop. The initial value of M is 13 which causes cursor placement under the alphabetical letter "M," as shown in FIG. 4. The initial value of R is 27. There is also a left limit variable L, which has an initial value of 1. Operation of the left movement control 34 has no effect upon the value of L.

2. If the right movement control 36 is selected, then the value of R remains fixed and L is set to a new value in accordance with the equation $L=M+1$.

3. Calculate a new value for M in accordance with the equation $M=INT((L+R)/2)$, where INT denotes the integer function.

4. Reset the position of the cursor in accordance with the new value of M.

After the first operation of switch 34, the value of M becomes 6, and the cursor points to the letter "F." After two more switch closures, the cursor points to the letter "A," as illustrated in FIG. 5.

After the letter A has been designated, the operator creates a pick command by depressing switch 32. This generates a letter designating signal which indicates to the computer that the initial letter of the first word of the message is "a." The computer then accesses its file of all such words and presents the middle word thereof on the lower left-hand corner of the screen, as illustrated in FIG. 6. For the purposes of this example, it is assumed that the middle word of the file is "anaphase". Thereafter the file of "A" words is switched on a binary basis as illustrated in FIGS. 7 and 8 by operating switches 34, 36. The logic is the same as for selection of an initial letter, except for the selection of the initial values for the variables M, L and R. M is assigned the value for the middle of the file. L is assigned a value of 1. R is assigned a value equal to the number of words in the file. For the example being described herein, a single operation of the left switch causes selection of the word "afro," as illustrated in FIG. 7. Thereafter a single operation of the right switch causes selection of the word "alloy," as illustrated in FIG. 8.

A this point, four options are available to the operator. The left, right and pick switches may be used to produce left searching, right searching, or selection of the word "alloy." Alternatively, the "9/E" switch may be operated to cause appearance of the display illustrated in FIG. 9. When this display is present, the operator is able to edit the word last produced by the search. Seven editing options are available. These options may be selected by moving the illustrated indicating arrow up or down with the left or right switches and then pressing either the "P" or "9/E" switch. As illustrated in FIGS. 10 and 11, the indicating arrow has been moved down to the phrase "Capitalize first letter," after which the "P" switch has been actuated to capitalize the word alloy.

After the first word has been edited, as described, the screen appears as illustrated in FIG. 12. The presentation is the same as the initial presentation illustrated in FIG. 4, except that the edited first word "Alloy" appears immediately below the alphabetical string. Thereafter the next word "toasty" is placed in the message by selecting the letter "T" and searching the corresponding file of "T" words, as illustrated in FIGS. 13-15.

FIGS. 16-23 illustrate a feature of the program whereby character strings may be assembled on a symbol-by-symbol basis. The first step is to place the cursor under the "build" symbol (FIG. 16) and operate the "P" switch to produce the display of symbols illustrated in FIG. 17. Thereafter the desired sequence of symbols are designated and picked, as illustrated in FIGS. 18-21. Those figures illustrate the sequence for building the word "is." In the particular program set forth in the attached program listing, cursor movement through the string of available symbols progresses on a symbol-by-symbol basis. However, the above described binary technique could also be used.

It will be appreciated that a data base of reasonable size most likely would include the word "is" within its file of "I" words. The above example is given merely for purposes of illustration.

After the desired string of symbols has been assembled, the operator actuates the "9" switch to produce the display illustrated in FIG. 22. At this point in the program, the operator may edit the selected string of symbols, as illustrated by the selections appearing on the screen of FIG. 22. In the illustrated example, the operator selects "Do nothing to it" and actuates the "9" switch. This produces a display of processed text, as illustrated in FIG. 23. The technique may be continued to produce any desired message. When text processing is completed, exits the program by operating the "9" switch to produce the display of FIG. 24. At this point, the computer is prepared to send the text to the printer upon actuation of any key on keyboard 45.

A program listing for implementing the above described operational sequence is set forth in Table I. This program listing is written in that version of the BASIC language, which is understood by the IBM PC. Reference may be made to manuals available from the manufacturer of that computer for an explanation of each of the instructions set forth in Table I. The variables used in Table I are defined in Table II.

In very general terms, the instructions set forth in lines 10-80 initialize the computer. Following the initialization, there is a jump to the subroutine at lines 1000-1270 which enable the operator to pick a variable from the screen. That corresponds to the operation described above in connection with FIGS. 4 and 5. In the event that the "build" symbol is selected, then the procedure described above in connection with FIGS. 16-19 is implemented by the instructions appearing at lines 100-170. The binary search of a dictionary file, as described above in connections with FIGS. 6-9, is implemented by the instructions appearing at lines 180-310 of the program listing In lines 320-440 of the program listing, the computer enables the operator to pick or edit a word from a dictionary file or commence a new search within the file when the file has been exhausted by a presently pending search. Lines 450-470 strip blanks from the right side of a word and determine the length of the word. Lines 480-530 add a word to the current line of text, while lines 540-610 print the completed text upon the screen. Printing on the printer is effected by program lines 620-720.

Program lines 1000-7050 are a series of subroutines which are utilized by the main program. As noted above, the subroutine for picking a variable from the screen is set forth at program lines 1000-1140. Processing of switch inputs is accomplished by the subroutine at lines 1150-1270, and switch reading is accomplished by the subroutine at lines 2000-2140. These subroutines and the other subroutines set forth in the program listing will be readily understood by anyone having a working knowledge of the BASIC programming language.

Figure 26:
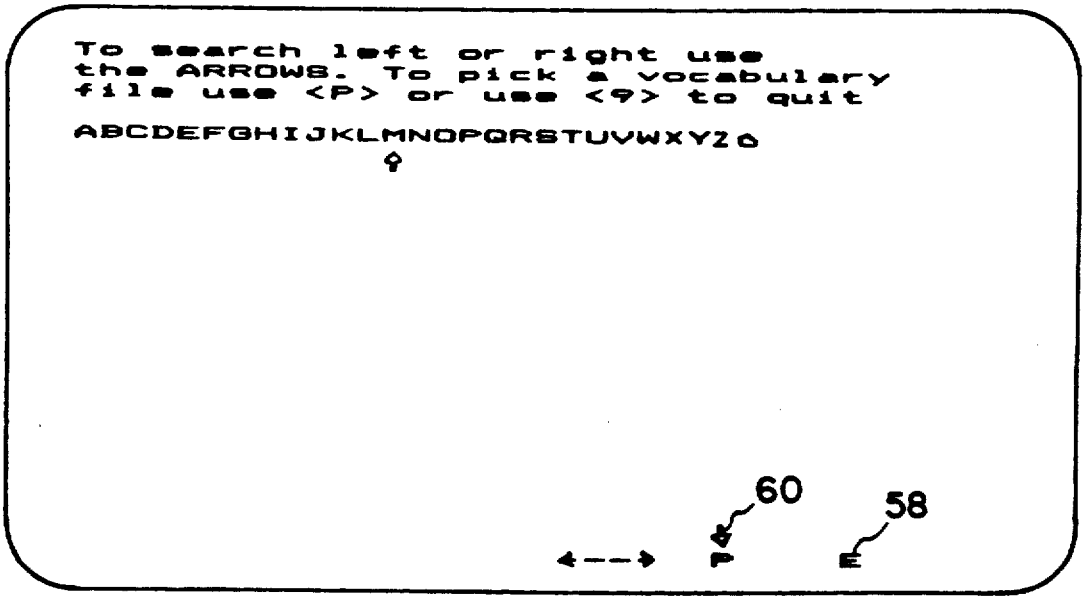
FIG. 26 illustrates a monitor presentation during text processing in accordance with an alternative embodiment of the invention.
Figure 25:
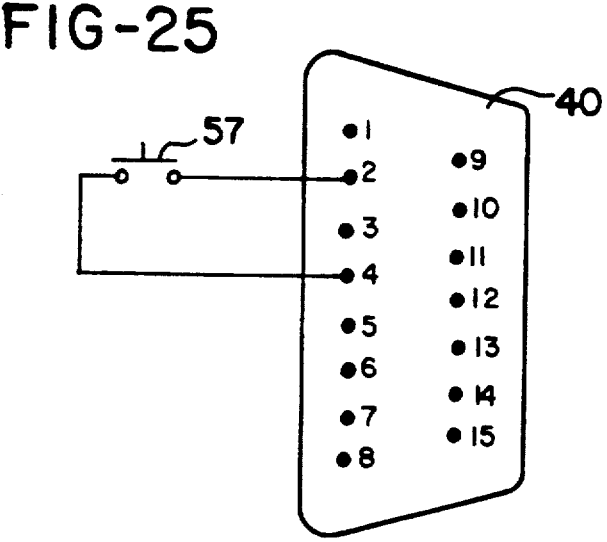
FIG. 25 illustrates wiring connections for a game port connector as appropriate for an alternative embodiment of the invention.

In an alternative embodiment, switches 32, 34, 36 and 38 may be replaced by a single switch 57 wired into game port connector 40, as illustrated in FIG. 25. For the alternative embodiment, program lines 2010-3000 are modified to read as set forth in Table III. When the system is so configured and modified, the initial screen presentation appears as illustrated in FIG. 26. This presentation includes a line 58 containing left arrow, right arrow, "P" and "E." An arrow 60 is positioned above the line 58 and is strobed back and forth above the characters therein. Those characters correspond to the four switches 32, 34, 36, 38, and selection of one of the characters has the same effect as activating the corresponding one of the switches. Such selection is made by activating switch 57 when the arrow 60 is pointing toward the symbol to be selected. Line 58 and arrow 60 are presented on all screens displayed in connection with the alternative embodiment.

TABLE I

SOURCE CODE LISTING

```
01 REM COPYRIGHT 1985 WRIGHT STATE UNIVERSITY
10 REM PROGRAM TO PRODUCE TEXT "TEXTBLDR.15S" USING
   SWITCH BOX ONLY
20 REM WITH HORIZONTAL FILE PICKING
30 WIDTH 40
40 RM=66: REM SET RIGHT MARGIN
50 KEY OFF
60 DIM N1$(100),N2$(100),L$(1000):REM N1$ & N2$ = SCREEN
   VAR I.E. A,B,?etc, L$=LINE NUMBERS
70 GOSUB 3000
80 CLS
90 GOSUB 1000
100 IF N$="9" THEN 540
110 IF N$=CHR$(127) THEN GOSUB 5000
120 REM IF LEN(W$)<1 THEN 140
130 REM IF N$=CHR$(127) AND INSTR(1,W$,CHR$(255))>0 THEN
    L$(K3)=W$:GOTO 170
140 IF N$=CHR$(127) THEN IF LEN(W$)=0 THEN 170
150 IF N$=CHR$(127) THEN IF LEN(L$(K3-K4))=0 THEN
    L$(K3-K4)=W$+" " ELSE IF F5=1 THEN F5=0:IF (LEN(W$)+
    LEN(L$(K3-K4))) >RM THEN GOSUB 7020 ELSE L$(K3-K4)=
    LEFT$(L$(K3-K4),LEN(L$(K3-K4))−1)+W$+" "ELSE
    L$(K3-K4)=L$(K3-K4)+W$+" "
160 REM
170 IF N$=CHR$(127) THEN 90
180 IF N$<"N" THEN F$="C:" ELSE F$="C:": REM START OF
    BINARY SEARCH
190 OPEN "R",1,(F$+N$),15
200 FIELD 1,15 AS S$
210 GET 1,1:I1=VAL(S$):REM I1 IS THE # RECORDS +1
220 CLS
230 PRINT "To search the file use":PRINT"the LEFT OR
    RIGHT ARROWS."
240 PRINT "To pick a word use <P>.":PRINT"If you want to
    EDIT the word or get out of the file use <E>"
250 PRINT:GOSUB 4000
260 N=I1−1:M=INT((N+1)/2):L=1:R=N
270 LOCATE 25,1
280 PRINT STRING$(17,0);
290 LOCATE 25,1
300 GET 1,M+1:REM M+1 SINCE RECORD #1 CONTAINS RECORD
    COUNT +1
310 PRINT " ";S$;
320 GOSUB 2000
330 IF K1$="9" THEN CLOSE 1:CLS:GOSUB 6000 ELSE 400: REM
    GO TO WORD EDIT
340 IF FLAG2=0 THEN CLOSE 1: GOTO 80
342 IF DNTI=1 THEN 400
350 LOCATE 25,1: PRINT " ";S$;
360 LOCATE 2,1:PRINT " <P> = PICK":PRINT " <9> =
    EDIT":PRINT:PRINT
370 GOSUB 4000
372 GOSUB 2000
380 IF K1$="K" or K1$="M" THEN 372
390 GOTO 330
400 IF K1$="P" THEN CLOSE 1:CLS:GOTO 450
410 IF RIGHT$(K1$,1)="K" THEN R=M−1 ELSE L=M+1
420 IF L>R THEN 220
430 M=INT((L+R)/2)
440 GOTO 270
450 FOR I=LEN(S$) TO 1 STEP −1
460 IF MID$(S$,I,1)<>" " THEN 480
470 NEXT I
480 IF (LEN(L$(K3-K4)+MID$(S$,1,I))−1)> RM THEN IF F6=1
    THEN F6=0: GOSUB 7000: GOTO 510 ELSE K3=K3+1
```

TABLE I-continued
SOURCE CODE LISTING

```
490 IF F6=1 THEN IF LEN(L$(K3-K4))>0 THEN L$(K3-K4)=MID$
    (L$(K3-K4),1,LEN(L$(K3-K4))-1)+MID$(S$,1,I2)+" ":GOTO
    520
500 L$(K3)=L$(K3)+MID$(S$,1,I)+" "
510 IF F7=1 THEN L$(K3)=L$(K3)+" "
520 FLAG2=0:F6=0:F7=0: DNT1=0: REM RESET FLAGS
530 GOTO 90
540 CLS
550 REM -----------------------------------------------
560 REM PRINTER ROUTINE ------------------------------
570 REM FLAG1=1
580 WIDTH 80
590 FOR P=0 TO K3
600 IF L$(P)="" THEN PRINT :GOTO 610 ELSE PRINT L$(P)
610 NEXT P
620 PRINT:PRINT:PRINT "INPUT ANY KEY TO PRINT TEXT TO
    PRINTER"
630 GOSUB 2000
640 FOR P=0 TO K3
650 IF L$(P)="" THEN LPRINT: GOTO 660 ELSE LPRINT L$(P)
660 NEXT P
670 REM FLG1=0
680 REM -----------------------------------------------
690 PRINT:PRINT "INPUT ANY KEY TO CONTINUE"
700 GOSUB 2000
710 END
1000 REM ROUTINE TO PICK A VARIABLE FROM THE SCREEN
    ADAPTED FROM - "PICKIT3"
1010 REM WHICH PROVIDES FOR A HORIZONTAL BINARY SEARCH
1020 CLS
1030 PRINT"To search left or right use":PRINT"the ARROWS.
    To pick a vocabulary"
1040 PRINT"file use <P> or use <9> to quit"
1050 PRINT
1060 FOR I=1 TO 27
1070 PRINT N2$(I);
1080 NEXT I
1090 PRINT:PRINT:PRINT:PRINT:GOSUB 4000
1100 N=27:M=13:L=1:R=27:REM ********** SETS BINARY
    PARAMETERS
1110 X=M
1120 Z=6
1130 LOCATE Z,X
1140 PRINT CHR$(24);
1150 GOSUB 2000
1160 IF K1$="9" THEN N$="9": GOTO 1270
1170 IF K1$="P" THEN N$=N2$(M): GOTO 1270
1180 REM IF K1$="P" THEN 1260
1190 LOCATE Z,X:PRINT" "
1200 REM ****************** START OF BINARY SEARCH PATTERN
1210 IF RIGHT$(K1$,1)="K" THEN R=M-1 ELSE L=M+1
1220 IF L>R THEN 1100
1230 M=INT((L+R)/2)
1240 X=M
1250 GOTO 1130
1260 REM IF K1$="9" THEN N$="9" ELSE N$=N2$(M)
1270 RETURN
2000 REM SUBROUTINE FOR SWITCH INPUTS
2010 REM LEFT ARROW IS (00H+K) & RIGHT ARROW IS (00H+M)
2020 REM UP ARROW IS (00H+H) & DOWN ARROW IS (00H+P)
2030 REM SWITCH INPUT IS TO RETURNED AS K1$
2040 FOR W=1 TO 50:NEXT W:REM STROBING DELAY (ORIGINAL 1
    to 200 )
2050 K1=240:K1=INP(513):K1=K1 AND 240:IF K1=240 THEN 2050
2060 IF K1=224 THEN K1$="K":GOTO 2130
2070 IF K1=208 THEN K1$="M":GOTO 2130
2080 IF K1=176 THEN K1$="P":GOTO 2130
2090 IF K1=112 THEN K1$="9":GOTO 2130
2100 GOTO 2050
2110 REM
2120 REM
2130 RETURN
2140 REM
2150 REM
3000 REM SUBROUTINE TO SET SCREEN VARIABLES N1$ AND N2$ ---
3010 FOR I=1 TO 26:n2$(I)=CHR$(I+64):NEXT I
3020 N2$(27)=CHR$(127)
3030 FOR I=1 TO 13:N1$(I)=CHR$(I+96):NEXT I
3040 N1$(14)=CHR$(27):N1$(15)=CHR$(32):N1$(16)=CHR$(46)
3050 FOR I=14 TO 26: N1$(I+3)=CHR$(I+96):NEXT I
3060 K=47
```

TABLE I-continued

SOURCE CODE LISTING

```
3070 FOR I=30 TO 39:K=K+1:N1S(I)=CHRS(K):NEXT I
3080 K=32
3090 FOR I=40 TO 52:K=K+1:N1S(I)=CHRS(K):NEXT I:
     N1S(53)=CHRS(47)
3100 K=57
3110 FOR I=54 TO 60:K=K+1:N1S(I)=CHR(K):NEXT I
3120 RETURN
3130 REM
4000 REM WIDTH 40 SCREEN PRINTING
4010 REM IF FLAG1=1 THEN X1=P:CLS:GOTO 4030
4020 L=36:REM LINE LENGTH
4030 IF K3> = 5 THEN X1=K3-5 ELSE X1=0
4040 REM
4050 L2=LEN(LS(X1))
4060 IF L2>L+1 THEN 4070 ELSE PRINT LS(X1): GOTO 4100
4070 FOR L3=L TO 1 STEP -1
4080 IF MIDS(LS(X1),L3+1,1)=" " OR MIDS(LS(X1),L3+1,1)="-"
     THEN PRINT LEFT S(LS(X1),L3+1) ELSE NEXT L3
4090 PRINT RIGHT S(LS(X1),L2-L3-1)
4100 X1=X1+1
4110 IF X1< = K3 THEN 4040
4120 RETURN
5000 REM ROUTINE TO BUILD A WORD FROM THE SCREEN ADAPTED
     FROM - "WORDBLD2"
5010 REM WHICH PROVIDES FOR A HORIZONTAL BINARY SEARCH
5020 CLS:F5=0:K4=0:REM ZEROS THE APPEND FLAG
5030 WS=""
5040 PRINT"To search use the ARROWS"
5050 PRINT"To pick use <P> or 9 to quit"
5060 PRINT:PRINT
5070 FOR I=1 TO 14
5080 PRINT N1S(I);
5090 NEXT I
5100 FOR I=15 TO 29
5110 PRINT N1S(I);
5120 NEXT I
5130 PRINT:PRINT:PRINT
5140 FOR I=30 TO 39
5150 PRINT N1S(I);
5160 NEXT I
5170 PRINT:PRINT:PRINT
5180 FOR I=40 TO 60
5190 PRINT N1S(I);
5200 NEXT I
5210 PRINT
5220 M=15
5230 IF M<30 THEN Z=6:X=M
5240 IF M>29 THEN Z=9:X=(M-29)
5250 IF M>39 THEN Z=12:X=(M-39)
5260 LOCATE Z,X
5270 PRINT CHRS(24)
5280 GOSUB 2000
5290 IF K1S="9" THEN 5430
5300 IF K1S="P" AND LEN(WS)>65 THEN 5430
5310 IF K1S="P" THEN LOCATE 25,2:PRINT "LENGTH: ";LEN(WS1;
     :GOTO 5370
5320 LOCATE Z,X:PRINT" "
5330 IF RIGHTS(K1S,1)="K" THEN M=M-1 ELSE M=M+1
5340 IF M<1 THEN M=60
5350 IF M>60 THEN M=1
5360 GOTO 5230
5370 IF N1S(M)=CHRS(27) THEN K3=K3+1:K4=K4+1
5380 IF N1S(M)=CHRS(32) THEN WS=WS+CHRS(250) ELSE
     WS=WS+N1S(M)
5390 LOCATE Z,X:PRINT " ";
5400 LOCATE 15,1:PRINT"-> ";
5410 IF LEN(WS)>=L THEN PRINT:PRINT MEDS(WS,L,LEN(WS));
     ELSE PRINT WS;
5420 GOTO 5220
5430 CLS
5440 PRINT"To move use the arrow.":PRINT"Use <P> or <9> to
     PICK your choice"
5450 PRINT:PRINT:PRINT
5460 PRINT"----> ";
5470 IF LEN(WS)> =32 THEN PRINT LEFTS(WS,32):PRINT
     RIGHTS(WS,LEN(WS)-32)
5480 PRINT
5490 PRINT "    Do nothing to it"
5500 PRINT
5510 PRINT "    Append it to the previous word"
5520 PRINT
```

TABLE I-continued

SOURCE CODE LISTING

```
5530 PRINT "    Capitalize first letter"
5540 PRINT
5550 PRINT "    CAPITALIZE WHOLE WORD"
5560 PRINT
5570 PRINT "    Discard it please"
5580 REM
5590 PRINT:PRINT
5600 Y=10
5610 X=1
5620 LOCATE Y,X
5630 PRINT"->"
5640 GOSUB 2000
5650 IF K1$="P" OR K1$="9" THEN 5710
5660 LOCATE Y,X:PRINT" "
5670 IF RIGHT$(K1$,1)="M" THEN Y=Y+2 ELSE Y=Y-2
5680 IF Y>18 THEN Y=10
5690 IF Y<10 THEN Y=18
5700 GOTO 5620
5710 FOR C2=1 TO LEN(W$)
5720 IF MID$(W$,C2,1)=CHR$(250) THEN MID$(W$,C2,1)=" ":
     REM REMOVES DOT
5730 NEXT C2
5740 CR=INSTR(1,W$,CHR$(27)): IF CR=1 THEN W$="" ELSE IF
     CR>1 THEN W$=LEFT$(W$,CR-1)
5742 IF W$="" THEN 5960
5750 CLS:ON Y-9 GOSUB,,5790,,5800,,5870,,5930
5760 REM
5770 GOTO 5960
5780 RETURN
5790 F5=1:RETURN:REM SETS APPEND FLAG
5800 REM Capitilizing first letter
5810 FOR I=1 TO LEN(S$):W=ASC(MID$(W$,I,1))
5820 IF W>96 AND W<123 THEN 5850
5830 NEXT I
5840 GOTO 5860
5850 W$=MID$(W$,1,I-1)+CHR$(ASC(MID$(W$,I,1))-32)+RIGHT$(W$,
     LEN(W$)-I)
5860 RETURN
5870 REM CAPITALIZING the whole word
5880 FOR I=1 TO LEN(W$)
5890 X=ASC(MID$(W$,I,1))
5900 IF X>96 AND X<123 THEN MID$(W$,I,1)=CHR$(X-32)
5910 NEXT I
5920 RETURN
5930 W$=""
5940 K3=K3-K4
5950 RETURN
5960 RETURN
6000 REM ROUTINE TO EDIT A WORD FROM MID$(S$,1,I) --------
6010 REM FIND LAST CHARACTER OF STRING (ADAPTED FROM LINES
     360-364)
6020 FOR I2=LEN(S$) TO 1 STEP -1
6030 IF MID$(S$,I2,1) <> " " THEN 6050
6040 NEXT I2
6050 FLAG2=1:K=0:DNTI=0
6060 PRINT"To move use the arrows.":PRINT "Use <P> or <9>
     to pick your choice";
6070 PRINT:PRINT:PRINT:PRINT
6080 PRINT "----> ";MID$(S$,1,I2);
6090 PRINT:PRINT
6100 PRINT:PRINT "    Do nothing to it"
6110 PRINT:PRINT "    Capitalize first letter"
6120 PRINT:PRINT "    CAPITALIZE WHOLE WORD"
6130 PRINT:PRINT "    Add a period (and a space)"
6140 PRINT:PRINT "    Delete last letter"
6150 PRINT:PRINT "    Append to last word"
6160 PRINT:PRINT "    Discard the word"
6170 PRINT:PRINT
6180 Y=9: X=1
6190 LOCATE Y,X
6200 PRINT "->"
6210 GOSUB 2000
6220 IF K1$="P" OR K1$="9" THEN 6280
6230 LOCATE Y,X:PRINT " "
6240 IF RIGHT$(K1$,1)="M" THEN Y=Y+2 ELSE Y=Y-2
6250 IF Y > 21 THEN Y=9
6260 IF Y < 9 THEN Y=21
6270 GOTO 6190
6280 CLS:ON Y=8 GOSUB 6290,,6300,,6370,,6440,,6470,,6520,,
     6550:RETURN
6290 DNTI=1: RETURN
```

TABLE I-continued
SOURCE CODE LISTING

```
6300 REM CAPITALIZE FIRST LETTER OF THE WORD
6310 FOR C1=1 TO I2:P1=ASC(MID$(S$,C1,1))
6320 IF P1>96 AND P1<123 THEN 6340
6330 NEXT C1
6340 IF C1=I2+1 THEN 6360
6350 MID$(S$,1,I2)=CHR$(ASC(MID$(S$,C1,1))-32)+MID$(S$,C1+1,
     I2)
6360 RETURN
6370 REM CAPITALIZE THE ENTIRE WORD
6380 FOR C=1 TO LEN(MID$(S$,1,I2))
6390 P=ASC(MID$(S$,C,1))
6400 IF P>96 AND P<123 THEN MID$(S$,C,1)=CHR$(P-32)
6410 NEXT C
6420 RETURN
6430 REM ADD A PERIOD AND TWO SPACES
6440 MID$(S$,I2+1,1)="."
6450 F7=1
6460 RETURN
6470 REM DELETE LAST LETTER
6480 K=LEN(MID$(S$,1,I2))-1
6490 IF K> =0 THEN MID$(S$,K+1,1)=" "
6500 RETURN
6510 REM APPEND TO LAST WORD
6520 F6=1
6530 RETURN
6540 REM DISCARD THE WORD
6550 MID$(S$,1,I2)=SPACE$(I2):FLAG2=0:F7=0:F6=0
6560 RETURN
6570 FOR AA=1 TO LEN(S$(1)):PRINT ASC(MID$(S$(1),AA,1));
     " ";:NEXT AA
7000 REM APPEND SUBROUTINE (CATCHES WRAP AROUND ERRORS)
7010 W$=MID$(S$,1,I)
7020 FOR I3=(LEN(L$(K3-K4))-1) TO 1 STEP -1
7030 IF MID$(S$(K3-K4),I3,1) = " " THEN L$(K3-K4+1)=MID$
     (L$(K3-K4),I3+1,LEN(L$(K3-K4))-I3-1)+W$+" ":
     L$(K3-K4)=LEFT$(S$(K3-K4),I3):K3=K3+1: GOTO 7050
7040 NEXT I3
7050 RETURN
```

TABLE II
LISTING OF VARIABLES

STRING VARIABLES

| | |
|---|---|
| F$ | Determines which disk drive to access. |
| K1$ | Used in switch input routine. K1$ is assigned the direction of the move. |
| L$ | This array contains each line of the text. One line can be up to 66 characters long. |
| N$ | Used to transfer data (characters, pick, end/edit information) from the "key input" subroutine to the main line of the program. |
| N2$ | An array variable used to hold the upper case alphabet. |
| N1$ | An array variable used to hold the lower case alphabet, the numbers 0-9 and all other characters needed for word processing. |
| S$ | A 15 character word fielded from the RANDOM ACCESS MEMORY dictionary. |
| W$ | Holds the contents of a string as the word is being built in the word build function. |

VARIABLES

| | |
|---|---|
| CR | Assigned the location of the first Carriage Return symbol in the string, W$, in the word build routine. |
| I1 | The number of records in the current RAM dictionary file plus one. |
| K | Parameter used as an offset when assigning an ASCII character to an array. |
| K1 | Returns a value from the game port in "switch input" routine. |
| K3 | Subscript for the array L$. |
| K4 | Counter used to determine the number of line feeds (i.e., carriage returns) that have occurred. |
| L | Parameter used in binary search routine; also used to determine the screen width (i.e., the length of string on the screen). |
| L2 | Length of the current line in the 40 width print routine. |
| L3 | Determines the position of a space of a hyphen in a string. |

TABLE II-continued
LISTING OF VARIABLES

| | |
|---|---|
| M | Parameter used in binary search routine. |
| N | Parameter used in binary search routine. |
| P | Used to determine if any character is a word is upper case (used in the "word edit" routine). |
| P1 | Same as above (used in the "word edit" routine). |
| RM | Sets the right margin on the printer and controls the length of the string L$. |
| W | Used to determine if the first character of a word is lower case. (Used in the "word build" routine.) |
| X | Parameter used to locate the position of a pointer that is printed on the screen in the "word build" routine; also used to determine which choice was made in this routine. |
| X1 | Used to increment line numbers of L$ when printing the text on the screen in the "width 40 screen printing" routine. |
| Z | Parameter used to locate the position of a pointer that is printed on the screen in the "word build" routine. |

FLAGS

| | |
|---|---|
| DNT1 | Used in the Word Edit routine to let the main line of the program know that the edited word is okay. |
| F5 | Append flag found in "word build" routine. Lets the main line of the program know that the following word is to be appended. |
| F6 | Same as above. Found in the "word edit" routine. Flag used to add a period and a space. Found in the "word edit" routine. |
| F7 | Flag used to add a period and a space. Found in the "word edit" routine. |
| FLAG2 | Used to determine if the word has been edited. |

FOR-NEXT-LOOP VARIABLES

| | |
|---|---|
| C | Used in "word edit" routine to capitalize an entire word. |
| C1 | Used in "word edit" routine to capitalize the first letter. |
| I | Used in main line to find the last character of the |

TABLE II-continued
LISTING OF VARIABLES

| | |
|---|---|
| | string. |
| I2 | Used to find the last character in the string, S$, in the "word edit" routine. |
| I3 | Used in the APPEND subroutine to locate the position of the last space in the current line of text. |
| P | Used in "printer output" routine to increment each line of text. |
| W | Used to determine strobing delay in the "switch input" routine. |

TABLE III
MODIFICATION FOR ALTERNATIVE EMBODIMENT

```
2000  REM SUBROUTINE FOR SINGLE SWITCH INPUT
2010  REM LEFT ARROW IS (00H+K) & RIGHT ARROW
      IS (00H+M)
2020  REM UP ARROW IS (00H+H) & DOWN ARROW IS
      (00H+P)
2030  REM SWITCH INPUT IS TO RETURNED AS K1$
2040  REM
2050  REM STEPPING PROG "STEP1.BAS"
2060  REM FOR SINGLE SWITCH CONTROL OF
2070  REM WORD PROCESSING
2100  LOCATE 25, 18
2104  IF F4=1 THEN PRINT
      " ";CHR$(24);"  ";CHR$(25);"
      P    E";:GOTO 2120
2110  PRINT " ";CHR$(27);"- -";CHR$(26);"  P  E";
2120  FOR O=20 TO 35 STEP 5
2130  LOCATE 24, O
2140  PRINT CHR$(25);
2150  FOR O1=1 TO 120:REM STEP DELAY
2160  X5=INP(513)
2170  IF X5=236 THEN 2220
2180  NEXT O1
2190  LOCATE 24,O:PRINT " ";
2200  NEXT O
2210  GOTO 2120
2220  REM
2230  FOR O2=1 TO 500:NEXT O2:REM SWTICH
      DEBOUNCE AND RELEASE DELAY
2240  IF O=20 THEN K1$="K"
2250  IF O=25 THEN K1$="M"
2260  IF O=30 THEN K1$="P"
2270  IF O=35 THEN K1$="9"
2274  LOCATE 24,O:PRINT" ";
2280  RETURN
3000  REM SUBROUTINE TO SET SCREEN VARIABLES
      N1$ AND N2$ —
```

While the methods herein described constitute preferred embodiments of this invention, it is to be understood that the invention is not limited to these precise methods, and that changes may be made without departing from the scope of the invention, which is defined in the appended claims.

What is claimed is:

1. In a computer system of a type having a data processing means capable of running a plurality of different application programs under an operating system having an interface for receiving data from a keyboard and communicating said data through said operating system to one of said application programs, an improved data entry mechanism comprising:
   a means for storing an ordered list of data arranged in a binary tree in which data elements are stored in separate nodes traversable through left and right branches;
   a first switching means for selective manipulation to a left state;
   a second switching means for selective manipulation to a right state;
   binary selection algorithm means coupled to said first and second switching means and to said means for storing an ordered list for selecting a particular data element;
   said selection algorithm defining a pointer for indicating a given data element in said ordered list and being responsive to said first switching means to cause said pointer to traverse left in response to said left state and being responsive to said second switching means to cause said pointer to traverse right in response to said right state;
   third switching means coupled to said selection algorithm for selective manipulation to cause the given data element indicated by said pointer to be input through said interface and said operating system to said application program.

2. The improvement of claim 1 wherein at least one of said first and second switching means comprises a push button.

3. The improvement of claim 1 wherein at least one of said first and second switching means comprises a joystick.

4. The improvement of claim 1 wherein said selection algorithm comprises a software program running under said operating system.

5. The improvement of claim 1 wherein said selection algorithm comprises a software program run by said data processing means.

6. The improvement of claim 1 wherein said selection algorithm is interactively coupled to said operating system.

7. The improvement of claim 1 wherein said selection algorithm is a memory resident program running under said operating system.

8. The improvement of claim 1 wherein said selection algorithm is a software program interactively coupled with at least one of said application programs running under said operating system.

9. A user interface for a word processing program of a type operable on a computer system running under an operating system, the operating system having a data interface for receiving data from a keyboard and for communicating said data through said operating system to said word processing program, comprising:
   means for storing an ordered list of words arranged in a binary tree in which said words are stored in separate nodes traversable through left and right branches;
   a first switching means for selective manipulation to a left state;
   a second switching means for selective manipulation to a right state;
   binary selection algorithm means coupled to said first and second switching means and to said means for storing an ordered list for selecting a particular word;
   said selection algorithm defining a pointer for indicating a given word in said ordered list and being responsive to said first switching means to cause said pointer to traverse left in response to said left state and being responsive to said second switching means to cause said pointer to traverse right in response to said right state;
   third switching means coupled to said selection algorithm for selective manipulation to cause a given word indicated by said pointer to be input through data interface and said operating system to said word processing program.

10. The user interface of claim 9 wherein at least one of said first and second switching means comprises a push button.

11. The user interface of claim 9 wherein at least one of said first and second switching means comprises a joystick.

12. The user interface of claim 9 wherein said selection algorithm comprises a software program running under said operating system.

13. The user interface of claim 9 wherein said computer system includes a data processing means and wherein said selection algorithm comprises a software program run by said data processing means.

14. The user interface of claim 9 wherein said selection algorithm is interactively coupled to said operating system.

15. The user interface of claim 9 wherein said selection algorithm is a memory resident program running under said operating system.

16. The user interface of claim 9 wherein said selection algorithm is a software program running concurrently with said word processing program running under said operating system.

* * * * *